United States Patent [19]

Modolo

[11] Patent Number: 4,829,847
[45] Date of Patent: May 16, 1989

[54] BICYCLE HANDLEBAR, PARTICULARLY FOR A RACING BICYCLE

[75] Inventor: Domenico Modolo, Conegliano, Italy

[73] Assignee: Modolo Adamo & C. S.N.C., Sarano Di S. Lucia Di Piave, Italy

[21] Appl. No.: 83,782

[22] PCT Filed: Nov. 8, 1986

[86] PCT No.: PCT/EP86/00645

§ 371 Date: Aug. 12, 1987

§ 102(e) Date: Aug. 12, 1987

[87] PCT Pub. No.: WO87/02956

PCT Pub. Date: May 21, 1987

[30] Foreign Application Priority Data

Nov. 15, 1985 [IT] Italy .................. 23836/85[U]

[51] Int. Cl.$^4$ .................................. B62K 21/12
[52] U.S. Cl. ........................... 74/551.1; D12/178
[58] Field of Search ............... 74/551.1, 551.2, 488, 74/489; D12/178

[56] References Cited

U.S. PATENT DOCUMENTS

| D. 208,448 | 8/1967 | Fritz | D12/178 |
| 588,166 | 8/1887 | McCoy | 74/551.1 |
| 3,760,648 | 9/1973 | Hoffman | 74/551.1 |
| 4,250,770 | 2/1981 | Robertson | 74/551.1 |
| 4,304,145 | 12/1981 | Shimano | 74/489 |
| 4,445,396 | 5/1984 | Shimano | 74/551.1 |
| 4,462,267 | 7/1984 | Shimano | 74/551.1 |
| 4,503,729 | 3/1985 | Shimano | 74/551.1 |
| 4,697,725 | 10/1987 | Miree | 74/551.1 |

FOREIGN PATENT DOCUMENTS

| 0053404 | 6/1982 | European Pat. Off. | 74/551.1 |
| 627623 | 10/1927 | France | 74/551.1 |
| 1063818 | 5/1954 | France | 74/551.1 |
| 1086626 | 2/1955 | France | 74/551.1 |
| 2476557 | 8/1981 | France | 74/551.1 |
| 2535669 | 5/1984 | France | 74/551.1 |
| 430157 | 2/1948 | Italy | 74/551.1 |
| 442238 | 2/1936 | United Kingdom | 74/551.1 |

Primary Examiner—Richard E. Moore
Assistant Examiner—Vinh Luong
Attorney, Agent, or Firm—Young & Thompson

[57] ABSTRACT

A bicycle handlebar that terminates in two rearwardly extending horizontal ends, these ends terminating forwardly in first upwardly curved portions having a first radius of curvature. These first upwardly curved portions terminate forwardly in forwardly and upwardly inclined rectilinear portions, these rectilinear portions terminating forwardly and upwardly in second upwardly curved portions having a second radius of curvature substantially smaller than the first radius of curvature. These second curved portions in turn terminate in upwardly and rearwardly inclined portions which terminate in a common crosspiece by which the handlebar is adapted to be secured to a stem of a bicycle.

2 Claims, 1 Drawing Sheet

BICYCLE HANDLEBAR, PARTICULARLY FOR A RACING BICYCLE

FIELD OF THE INVENTION

The present invention relates to a bicycle handlebar, particularly for a racing bicycle.

BACKGROUND OF THE INVENTION

The grip of a handlebar, in particular of sport and racing bicycles is generally in the form of a tube having a single radius bend. The palm of the hand must thus adhere to this bend: it will therefore lie on the two ends leaving an empty space in the central part. This causes a thickening of the skin at the extremities of the palm, as well as skin irritations and in general increased effort and a contraction of the hand and wrist muscles. This state of tension jeopardizes driving safety and requires in general an increased effort on the part of the rider, coming even to prevent perfect control of the bicycle.

OBJECT OF THE INVENTION

The aim of the present invention is to provide a perfectly anatomical handlebar which eliminates any uneven effort on the part of the rider.

BRIEF SUMMARY OF THE INVENTION

The aforesaid aim has been achieved by providing a curved handlebar having at the hand resting zone an almost rectilinear axis.

In particular, a handlebar is provided which has, besides a horizontal portion adapted to be engaged in the stem, also a concave zone bent towards the rider, said zone having in a first portion in front of the hand grip, that is in front of the thumb, a very small bending radius, and in the portion behind the hand, that is near the little finger a bending of much greater radius, i.e. about twice the previous one, while between these two zones a rectilinear portion bent about 3°–55° as regards to a vertical plane is provided, which extends for a distance almost equal to the width of the rider's palm.

BRIEF DESCRIPTION OF THE DRAWING

The present invention will be better illustrated on the basis of an exemplary embodiment which is shown in the enclosed drawing, wherein.

DETAILED DESCRIPTION OF THE INVENTION

Figure 1:
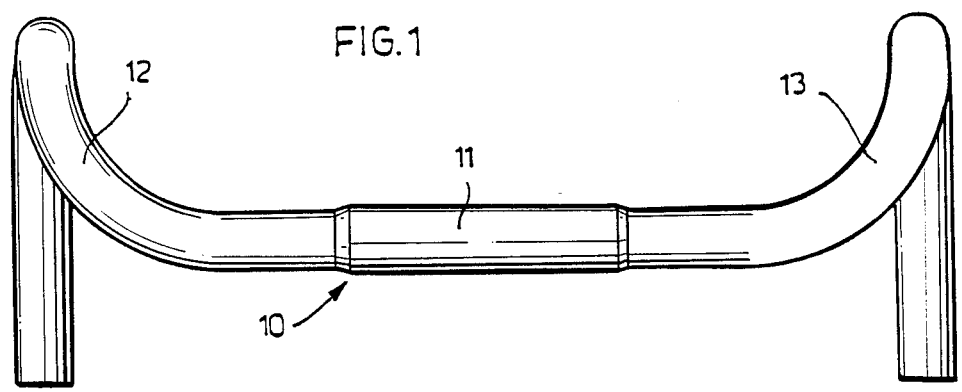
FIG. 1 is a top view of the proposed bicycle handlebar.

With reference to the drawing it will be noted that the proposed handlebar 10 is formed by a central fixing portion 11 which will be inserted in the stem of a bicycle and by two lateral sides 12 and 13 which are bent forward and then downward.

The forward bending is totally traditional; the subject of the invention concerns the bending of the bar in a vertical plane from top towards bottom so as to form a shaped cavity 17 turned towards the rider and capable of receiving his hands.

This cavity 17 is carried out by means of a succession of three portions linked one with the other; a first bent portion 14 has a very small radius r; a second rectilinear portion 16, has an inclination comprised between 35° and 55° as regards to the vertical; this portion is adjacent to the first bent portion 14; finally a third portion 15, has a bending radius R which is about twice the previous radius r and is also adjacent to the second portion. Normally the handlebar terminates with an end portion 18 almost horizontal.

Figure 2:
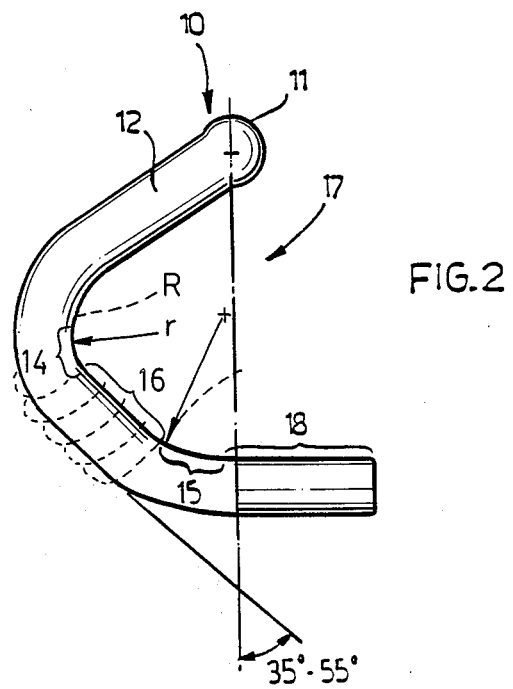
FIG. 2 is a side view of the same handlebar.

As it will be noted from FIG. 2 the hand of the rider can thus lie comfortably in the zone wherein the axis of the tube is almost rectilinear.

I claim:

1. A bicycle handlebar that terminates in two rearwardly extending horizontal free ends, said ends terminating forwardly in first upwardly curved portions having a first radius of curvature, said first upwardly curved portions terminating forwardly in forwardly and upwardly inclined rectilinear portions, said rectilinear portions terminating forwardly and upwardly in second upwardly curved portions having a second radius of curvature substantially smaller than said first radius of curvature, said second curved portions terminating in upwardly and rearwardly inclined portions which terminate in a common crosspiece by which said handlebar is adapted to be secured to a stem of a bicycle.

2. A bicycle handlebar as claimed in claim 1, in which said rectilinear portions form an angle of 35°–50° with the vertical.

* * * * *